US009843583B2

(12) United States Patent
Holz (10) Patent No.: US 9,843,583 B2
(45) Date of Patent: Dec. 12, 2017

(54) SYSTEM AND METHOD FOR AUTHENTICATION ACROSS DEVICES

(71) Applicant: YAHOO! INC., Sunnyvale, CA (US)

(72) Inventor: Christian Holz, San Francisco, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 137 days.

(21) Appl. No.: 14/478,390

(22) Filed: Sep. 5, 2014

(65) Prior Publication Data
US 2016/0072803 A1  Mar. 10, 2016

(51) Int. Cl.
*H04L 29/06* (2006.01)
*H04W 12/06* (2009.01)
*G06F 21/42* (2013.01)

(52) U.S. Cl.
CPC .............. *H04L 63/10* (2013.01); *G06F 21/42* (2013.01); *H04L 63/0853* (2013.01); *H04W 12/06* (2013.01)

(58) Field of Classification Search
CPC ...... G06F 21/00; G06F 21/36; G06F 21/6236; G06F 21/42; G06F 21/31; H04L 63/08; H04L 63/105; H04L 9/32; H04L 9/3231; H04L 63/0853; H04L 63/10; H04L 2209/56; H04L 63/126; H04L 63/1416; H04L 9/321; H04L 9/3218; H04L 2463/102; H04L 63/168; H04W 4/00; H04W 12/06; H02J 13/0075; H04B 2203/5483; H04B 2203/5495

USPC ........................................................... 726/7
See application file for complete search history.

(56) References Cited

U.S. PATENT DOCUMENTS

| | | | |
|---|---|---|---|
| 6,549,957 B1 * | 4/2003 | Hanson ................ | G06Q 10/107 709/206 |
| 7,730,113 B1 * | 6/2010 | Payette ................. | G06Q 10/00 707/821 |
| 2004/0034502 A1 * | 2/2004 | Jung ....................... | H04L 63/08 702/178 |
| 2008/0209526 A1 * | 8/2008 | Varghese .............. | H04L 9/3231 726/5 |
| 2011/0072473 A1 * | 3/2011 | Funabiki .......... | H04N 21/43637 725/81 |

OTHER PUBLICATIONS

Florian Alt, Bastian Pfleging, "Sonify—a platform for the sonification of text messages," Institute for Visualization and Interactive Systems, University of Stuttgart, 2013.
Thomas Hermann, "Taxonomy and definitions for sonification and auditory display," Proceedings of the 14th International Conference on Auditory Display, Paris, France Jun. 24-27, 2008.
Thomas Hermann, Andy Hunt, John G. Neuhoff, "The sonification handbook," Logos Publishing House, Berlin, Germany, 2011.

(Continued)

*Primary Examiner* — Kambiz Zand
*Assistant Examiner* — Abiy Getachew
(74) *Attorney, Agent, or Firm* — Cooper Legal Group, LLC (57) ABSTRACT

An authentication approach simplifies the process of authentication across devices, while increasing security. An authentication code is supplied through non-traditional channels, such as audio and visual channels, allowing more complex codes to pass between two devices for authentication with increased security, while reducing user interaction.

20 Claims, 11 Drawing Sheets

(56) References Cited

OTHER PUBLICATIONS

Greg Kumparak, "SlickLogin aims to kill the password by singing a silent song to your Smartphone," Sep. 9, 2013.
Hacker League, "Sonify Everything," London Web Summit Hackday, Mar. 2, 2013, London, England.
Rose Eveleth, "From Tweets to Tunes—Musicians Sonify Twitter," Smithsonian.com, Sep. 11, 2012.

* cited by examiner

SYSTEM AND METHOD FOR AUTHENTICATION ACROSS DEVICES

CROSS-REFERENCE TO RELATED APPLICATIONS

None.

FIELD OF THE INVENTION

The invention disclosed broadly relates to the field of login security and authentication, and more particularly relates to the field of login authentication across devices.

BACKGROUND OF THE INVENTION

Login procedures are becoming more complex in order to thwart trespassers. Multi-phase (or multi-factor) authentication is commonly considered the next desirable step in securing login procedures. Multi-phase authentication strengthens login password security by adding a second, third, or fourth layer of security to the process. The additional authentication factor commonly used with a password can be a PIN (personal identification number) code, a hardware token, an ATM card, or any one of various identifiers.

The current state of the art in verifying users across devices, however, trades off security and usability. For example, using four-digit codes sent via a SMS (short messaging service) message as the second factor to the user's mobile phone requires that the user manually type the code into a login form on a webpage (or application) displayed by a laptop, tablet or other computer. In order that the usability of this approach does not suffer substantially, the SMS codes are typically short and simple, often just four alphanumeric characters. This simplicity, while beneficial in terms of usability, renders codes that are easier to hack.

Figure 1:
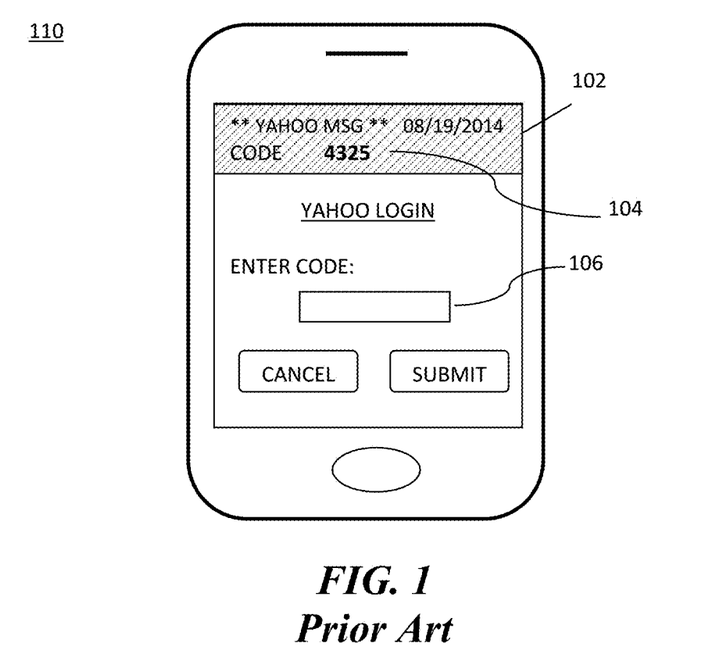
FIG. 1 shows an exemplary illustration of a mobile device implementing two-factor authentication, according to the known art.
Figure 2:
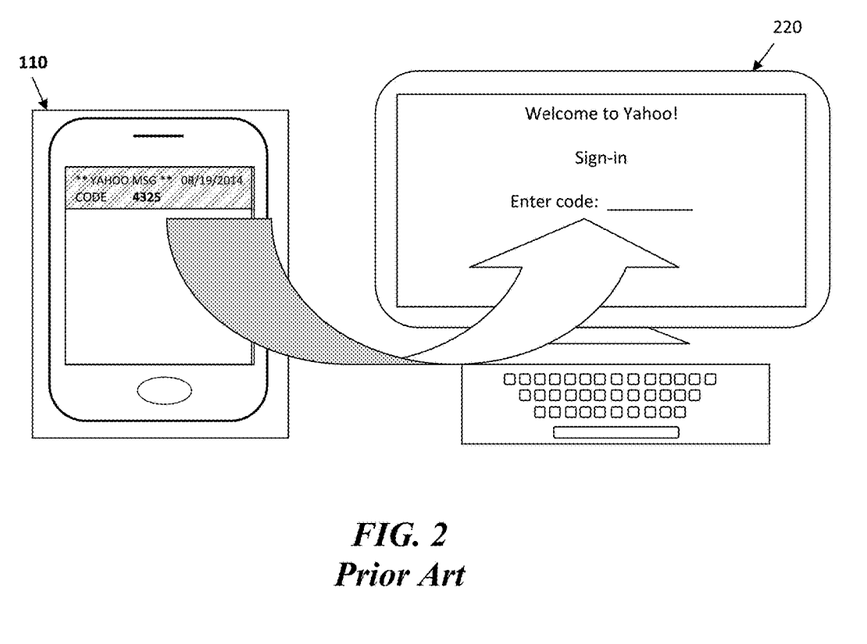
FIG. 2 shows an exemplary illustration of the use of two-factor authentication across devices, according to the known art.

Referring now to FIG. 1 there is shown a simplified exemplary illustration of authentication on a single device, such as a mobile phone 110, according to the known art. The code 104 sent via a SMS message 102 is previewed in the upper part of the device screen, allowing the user to view the application. The user simply enters the code 104 shown on his/her device 110 into the input box 106. Currently, four digit plain text codes are sent via SMS. The implementation is the same across devices, as shown in FIG. 2.

There is a need for an authentication process across devices that resolves the trade-off between security and usability.

SUMMARY OF THE INVENTION

Briefly, according to an embodiment of the present disclosure, a method for authentication across devices includes steps or acts of: initiating an at least one step of a verification procedure for authentication on a second device, using a non-textual authentication code; identifying a prompt for an authentication code on the second device; and transmitting a signal for verification as the non-textual authentication code. The signal can be transmitted directly to the second device or to a third device, such as a back-end server. The signal can be a visual or visualized display; or the signal can be an audio signal.

According to another embodiment of the present disclosure, an information processing system includes a first device with a memory operably coupled with a processor device. The processor device is configured to perform: initiating an at least one step of a verification procedure for authentication on a second device, using a non-textual authentication code; identifying a prompt for an authentication code on the second device; and transmitting a signal for verification as the non-textual authentication code.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We describe a novel system and method that simplifies the process of authentication across devices, while increasing security. This novel authentication approach removes the user from the process while boosting password protection. The user is no longer required to directly key in a code in the authentication process. Instead, an authentication code is supplied through other than the traditional channels (PIN numbers, SMS codes), including audio (speaker-microphone combinations) and visual (display-camera combinations) channels. This novel authentication across devices, while reducing required user interaction, allows more complex codes to pass between the two devices for authentication with increased security. Thus, the convenience, usability, and security of authentication methods across devices is improved.

Using audio and/or visual channels rather than traditional SMS or PIN codes, we resolve the currently existing trade-off between security (long and complex authentication codes) and usability (having to input the codes). Automatically exchanging one-time authentication codes sent through audio speakers (within the inaudible spectrum) or encoding information in the displayed screen, which the device's camera can display, frees the user from having to input text codes, while allowing for the use of complex security codes encoded within the sound and/or visual signals. The current methods of textual input of SMS codes trade off complexity for convenience, most often limiting the codes to four digit alpha-numeric characters. The security codes used in accordance with the below-described embodiments can be scaled to any desired and arbitrary depth and complexity because the user is no longer required to memorize and type in a code.

The authentication method, as discussed, can be advantageously implemented on any pair of devices, not just a phone/workstation pair. For example, we enable authentication across a TV (television) and desktop pair within a home network; or an iPad® tablet computer and TV pair; or two mobile phones, to name a few examples. In most use-case scenarios, a first device requires authentication on a second device. The first device can be a "personal device," such as a mobile phone 110 shown in FIG. 1 and we assume that this device seeks authentication in order to log in to the second device, depicted as a workstation 220 in FIG. 2. The workstation 220 can be a desktop computer, laptop, Internet TV, computer in an Internet café, tablet computer, or the like.

The depiction of the devices used in this disclosure is solely intended to enable an understanding of the implementation of this novel authentication solution. It should not be taken as limiting the devices involved in a multi-device authentication to a mobile phone and a workstation. All depictions are for explanatory purposes only and to aid in understanding of how the method works. Embodied solutions implement approaches for light-weight data exchange without requiring both devices to be on the same network or communicate using wireless technology such as Bluetooth®, a wireless technology standard. This is particularly useful in mobile settings and/or when one device is a public workstation.

It should be noted that if the first device is a mobile phone, the mobile phone does not need to be a "smart phone" (Internet-enabled phone). Any phone with MMS (multimedia messaging service) messaging capabilities can be used. Any mobile phone is able to receive a text message containing a sound and/or picture. Moreover, all of the solutions described herein can be implemented with two-factor (or more) authentication, wherein the sound or video signal authentication process is merely one phase of a multi-phase authentication process.

As used herein, "sonification" is a method for using non-speech audio to convey information. Sonification has sometimes been referred to as "audification." A more precise definition of sonification can be found in "Taxonomy and Definitions for Sonification and Auditory Display" by Thomas Hermann. In his paper, Herr Hermann defined sonification thusly: "Sonification is the transformation of data relations into perceived relations in an acoustic signal for the purposes of facilitating communication or interpretation."

Many different types of communication can be "sonified." Sonified data may sound like music; for example, mobile phone ringtones are sonified data. More information on the process of sonification, which is beyond the scope of this disclosure, can be found in "Sonify—A Platform for the Sonification of Text Messages," by Florian Alt and Bastian Pfleging of the Institute for Visualization and Interactive Systems, University of Stuttgart.

We leverage techniques for encoding audio input, such as: matched filtering for carrier detection, and chirp encoding for payload. Chirp encoding refers to encoding a code into a sound, i.e., sonification. A matched filter, used in signal processing, is obtained by correlating a known signal with an unknown signal in order to detect the presence of a template in the unknown signal.

Using high-frequency sounds further facilitates sound transmission, as noise, such as speech or music, does not interfere. Alternatively, an application (app), similar to the RSA cryptosystem, can be pre-installed on the personal device 110 and used to sonify a complex security code and then play it back. Moreover, APIs (application program interface) are available that enable an application to send a text message and receive a sonification as a MIDI (musical instrument digital interface) file. Some apps are capable of sonifying an incoming SMS (short messaging system message).

Sound Signal Embodiment.

Figure 3:
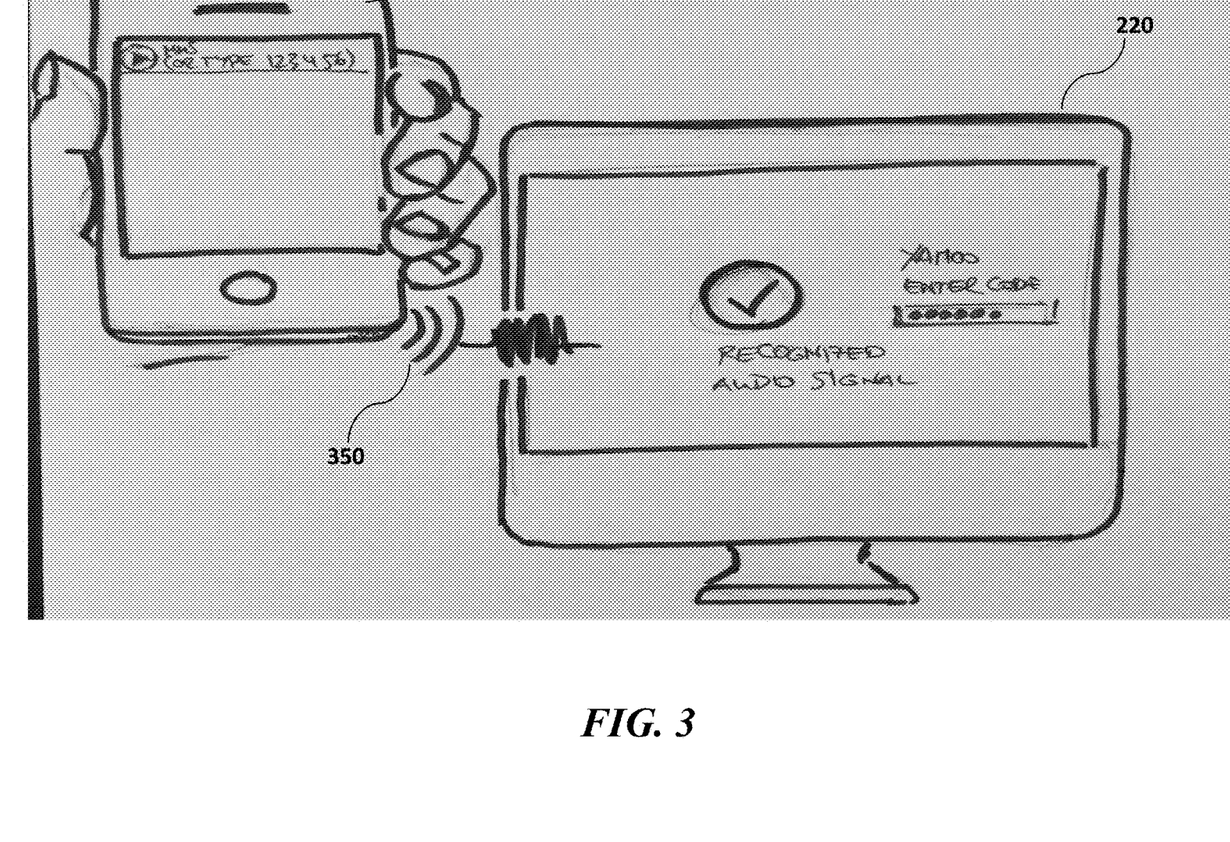
FIG. 3 shows an exemplary illustration of the implementation of a sound signal as an authentication medium, according to an embodiment of the present disclosure.

Referring now to FIG. 3, there is shown an implementation of an audio signal 350 used as an authentication code as part of a verification process, according to one embodiment of the present disclosure. The audio signal 350 replaces the traditional SMS or PIN code as the code in an authentication procedure. The sound signal embodiment is very easily implemented on a variety of devices, including a basic mobile phone. This is because today's mobile phones have MMS-capability and MMS (multimedia messaging service) can contain a sound signal.

This embodiment can also be implemented using a so-called "dumb" phone (one without Internet capability) because even dumb phones can send and receive text messages, and text message can play a sound that can be used for verification. The sonification can be performed by a backend server in communication with the device on which the user seeks authentication (the second device 220). In this manner no sonification logic is required on the mobile device 110. As an alternative, however, the mobile device 110 can include the logic for sonification.

Figure 7:
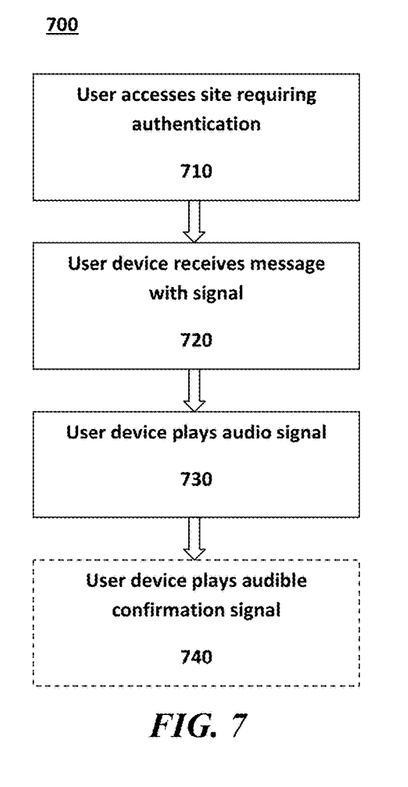
FIG. 7 shows a flowchart of the method for implementing the sound signal embodiment of FIG. 3, according to an embodiment of the present disclosure.

FIG. 7 shows a flowchart of the method steps for implementing the Sound Signal Embodiment of FIG. 3. In step 710, the user accesses a web page 225 on the second device 220 which requires authentication. In order to log in to a web service shown on the workstation 220, the web page 225 prompts the user for the correct sound signal for verification. Simultaneously with serving the login screen, the web service sends a message to the first device 110 with the code in the form of a sound signal. In step 720 the personal device 110 receives the message containing the audio signal 350.

The audio signal 350 can be sent to the device 110 as part of an MMS input, or as part of an app running on the device 110. After the user device 110 receives the MMS in step 720, the personal device 110 plays the sound 350 contained in the MMS message in step 730. Playback of the sound signal 350 can be triggered by the user opening the MMS message. The webpage 225 on the workstation 220 listens for the audio input and decodes the audio signal upon detection. Alternately, the personal device 110 can send the signal 350 to a backend server for authentication, rather than sending the signal 350 directly to the workstation 220.

To enhance security and prevent eavesdropping, the audio signal 350 can be set to a sonic tone that is inaudible to most users, such as tones over 19 kHz. Although most adults cannot hear sounds over 19 kHz, any computer device, such as the workstation 220, can still perceive and record the sound. Simultaneously, while inaudible to the user, the audio signal 350 can encode an audible and pleasant confirmation signal at a lower frequency that is audible to the user, such that the user perceives the playback of the audio, in step 740. The confirmation signal can also serve to confirm that the coded signal was sent and received. This last step is optional.

Upon recognition of the audio signal 350 by the workstation 220, the webpage 225 submits the input and the user is authenticated. The webpage 225 can proceed as described above. As a fallback to audio, the MMS can additionally include a text code, which the user enters as usual in the login form on the workstation 220 in case no microphone is available on the workstation 220. This encapsulates a two-factor authentication process, with the sound signal 350 as the first factor and the text code as the second factor. It will be understood by those with knowledge in the art that the sound signal 350 can be advantageously implemented as a single authentication medium, or in conjunction with other authentication mediums.

The benefits and advantages of the Sound Signal Embodiment are many. No modification is necessary on the personal device 110, as most support MMS out of the box. This works conveniently on personal workstations as well as public terminals, such as those found at airports or Internet cafes. Since these locales are typically ready for video conferencing, they frequently feature a microphone. In the case of the sonified audio code 350, no network connectivity is required, which is particularly beneficial when roaming in foreign countries.

Workstation Sound Signal Embodiment.

Figure 4:
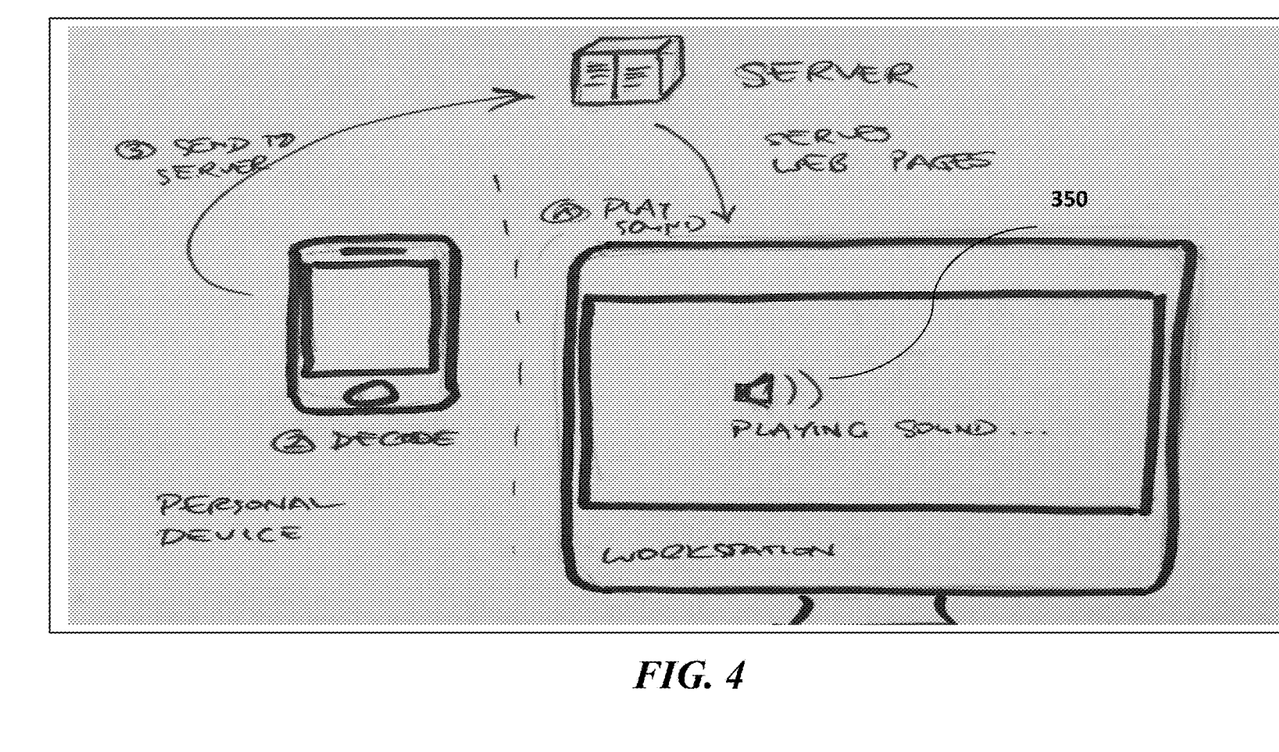
FIG. 4 shows an exemplary illustration of the implementation of a workstation sound signal for authentication, according to an embodiment of the present disclosure.

Referring now to FIG. 4, there is shown an implementation of an audio signal 350 transmitted from the workstation 220 for authentication, according to one embodiment of the present disclosure. Referring now to the flowchart of FIG. 8, after verifying the user's credentials in step 810, a login form in the browser on the workstation 220 plays a signal which sonifies an authentication code in step 820. Then the workstation 220 plays the encoded sound signal 350 in step 830. The authentication code can be any sequence of data, including letters, numbers, and other characters, that is then sonified. Examples include any kind of currently used code (four-digit number, PIN codes) or passwords. The longer and more complex, the safer this authentication factor becomes.

Figure 8:
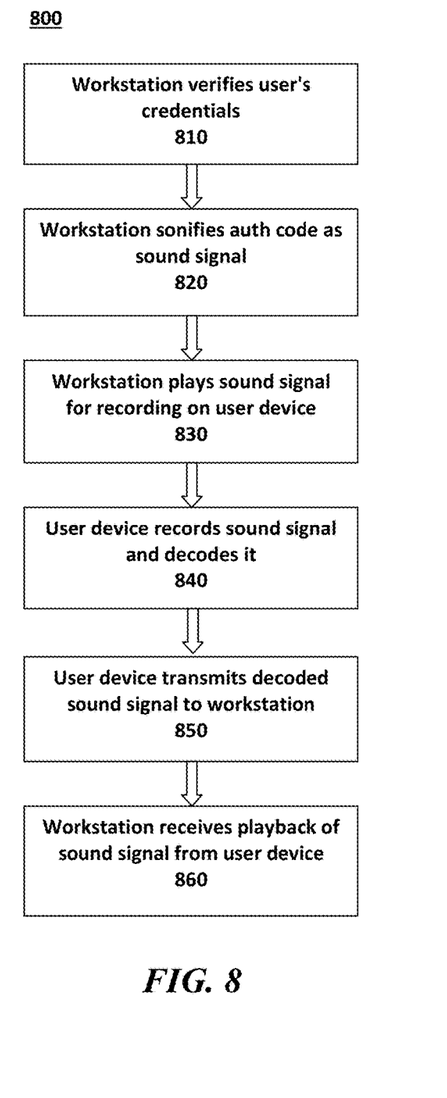
FIG. 8 shows a flowchart of the method for implementing a workstation-generated sound signal, according to an embodiment of the present disclosure.

The sound signal 350 is recorded on the personal device 110 from the workstation 220 in step 840. This may be done by the user holding his/her mobile device 110 up to the workstation 220 to record the signal 350. An app running on the personal device 110 records the audio, decodes the signal 350 and transmits the decoded signal to the server that served the webpage shown on the workstation 220 in step 850. The workstation 220 receives the playback of the sound signal 350 in step 860 and authenticates the user. After authenticating the user, the Web server 250 sends the new webpage to the now logged-in user on the workstation 220.

As in the Sound Signal Embodiment shown in FIG. 3, the sound signal 350 can be encoded in the inaudible sound spectrum and additionally encode a pleasant "okay" sound used as feedback for the user. This embodiment can be advantageously used with personal devices because they are generally configured to record and process audio. Webpages can also play sounds which can be captured by mobile devices.

Challenge Code Visual Embodiment.

Figure 5:
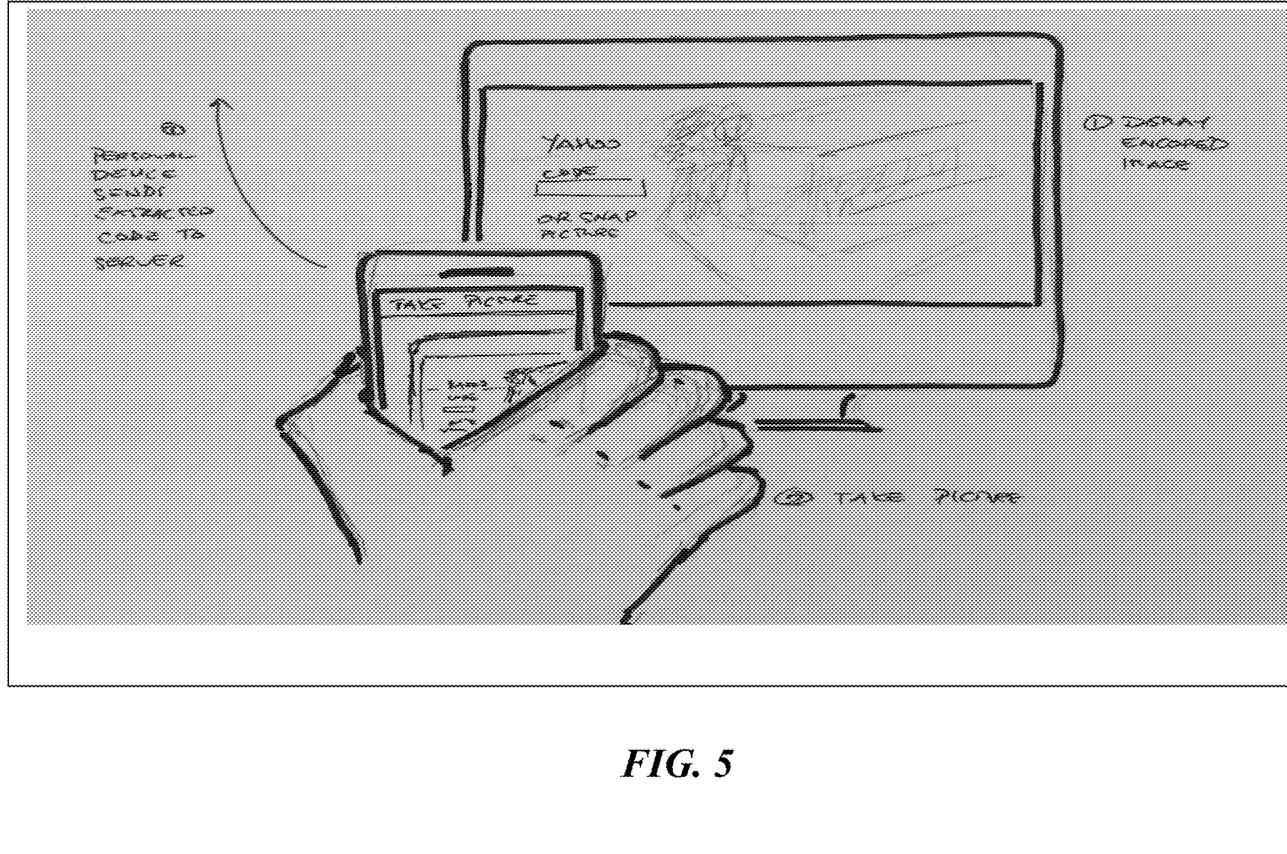
FIG. 5 shows an exemplary illustration of the implementation of a challenge code visual signal as an authentication medium, according to an embodiment of the present disclosure.
Figure 9:
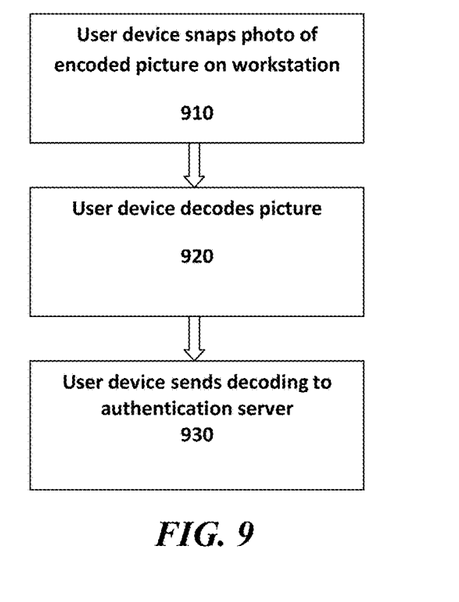
FIG. 9 shows a flowchart of a method for implementing a challenge code with a visual signal, according to an embodiment of the present disclosure.

Referring now to FIG. 5, there is shown an implementation of a Challenge Code Visual signal 550 used for verification in an authentication process, according to one embodiment of the present disclosure. The flowchart of FIG. 9 shows the process steps for the Challenge Code Visual embodiment. After verifying the user's credentials, a web application produces a webpage 225 on the workstation 220 that shows a picture. The picture encodes a code using steganography (message concealment). Using steganography, the visual code can be an obvious code such as a QR (quick response) code, a bar code, or a message/image/file hidden in another message/image/file. There are many different ways in which the encoding can be performed, all of which are beyond the scope of this disclosure.

The user snaps a photo of the screen on the workstation 220 with the mobile phone 110 in step 910. The photo is decoded on the personal device 110 in step 920 and the code is sent to the Web server 250 in step 930, which in turn sends updated webpages 225 to the now logged-in user on the workstation 220. The Web server 250 can simply encode codes in the images. This approach does not impact the UI (user interface) design or the UX (user experience), as the user sees only the image. Taking pictures is easy and virtually all users of personal devices know how to do it.

Workstation Visual Signal Embodiment.

Figure 6:
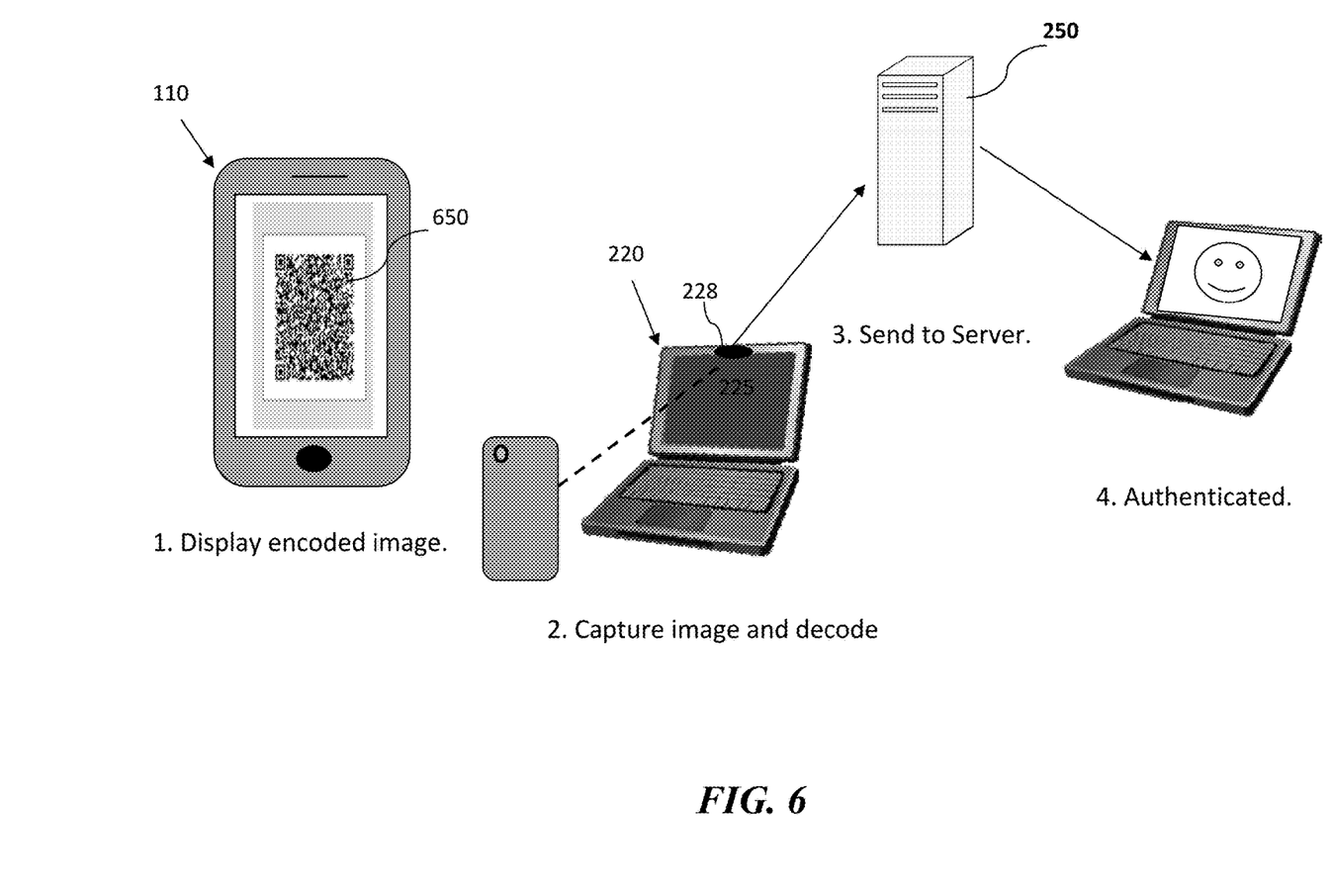
FIG. 6 shows an exemplary illustration of the implementation of a workstation visual signal for authentication, according to an embodiment of the present disclosure.
Figures 11, 12:
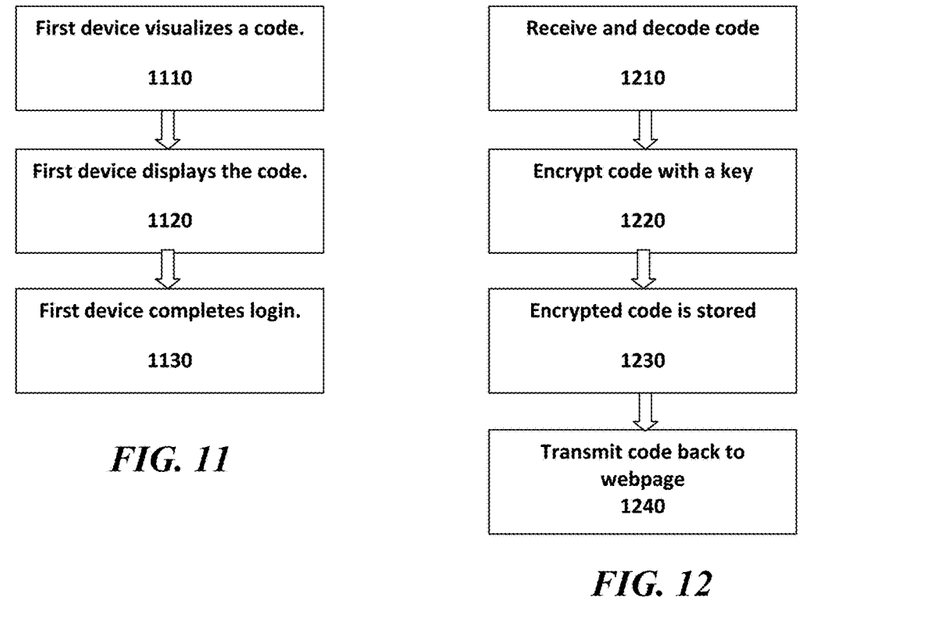
FIG. 11 shows a flowchart of a method for implementing a workstation-generated visual signal, according to an embodiment of the present disclosure.
FIG. 12 shows a flowchart of a method for implementing the challenge-response signal, according to an embodiment of the present disclosure.

Referring now to FIG. 6, there is shown an implementation of a Workstation Visual Signal as verification in an authentication process, according to one embodiment of the present disclosure. FIG. 11 shows a flowchart of the method for implementing the embodiment shown in FIG. 6. First, in step 1110, the personal device 110 visualizes a code 650 in a pattern, such as a QR (quick response) code or a personal image or an image that includes an encoded key. This is effectively a visualization of the user's key. In an alternative embodiment, the image used as the signal can be generated by a backend server for situations where the mobile device 110 is lacking the logic to perform the visualization.

In step 1120 the visual or visualized code 650 is displayed on the personal device 110, such that the webcam 228 in the workstation 220 can capture the screen with the displayed code 650. The webpage 225 displayed on the workstation 220 captures the camera image, decodes the shown image, verifies the user's key at the Web Server 250 and logs the user into the workstation 220 in step 1130.

In an optional step, the workstation 220 can provide the code to the user device 110. For example, the workstation 220 can prompt the user device 110 with a command such as "please enter this code into your mobile device." The user enters the code and an app on the mobile device 110 changes the code into another code and converts that code to sound or visual. The user merely has to be sure that the user device 110 is within sight/sound of the workstation 220. The user may or may not have to hold up the phone 110 to the workstation's camera 228.

This embodiment is similar to facial recognition, except that it is stronger than a static image recognition. In this approach, the key can change every minute, which will update the visualization on the personal device 110. This is easy to implement because most workstations 220 incorporate cameras 228, such as for video conferencing at Internet cafes or airports. All processing can be performed on the Web server 250, i.e., a light-weight front-end on the workstation 220 merely uploads the image captured from the camera. No network connectivity is required for the personal device 110. Optionally, the back-end server 250 can send an MMS with a code as a fallback.

Authentication Server Embodiment.

Figure 14:
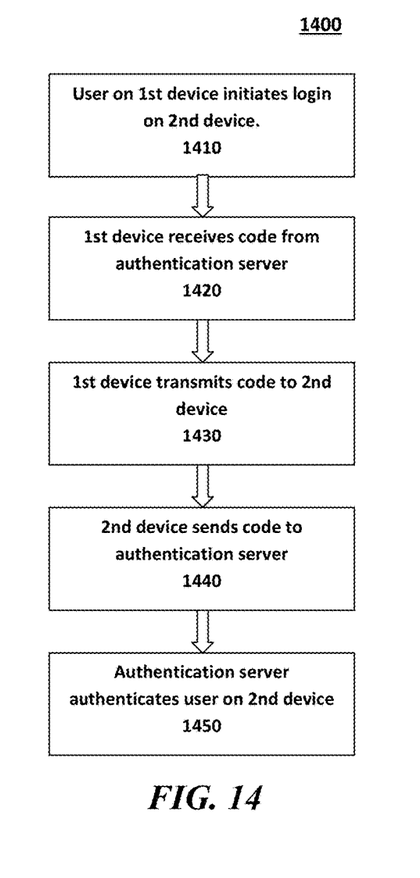
FIG. 14 shows a high-level flowchart of a method for implementing an authentication server embodiment, according to an embodiment of the present disclosure.

Referring now to the flowchart 1400 of FIG. 14, there is shown a high-level flowchart of the main processing steps to implement the authentication server embodiment, according to an embodiment of the present disclosure. In step 1410, a user of a first device 110 initiates a login procedure on a second device 220. For access to a restricted site, the user needs a code that the user's device 110 receives from an authentication server 250 in step 1420. The code can be sent from the authentication server 250 by SMS or other means. As previously stated, the code can be in a visual or audio format.

Next, the first device 110 transmits the code through visual or audio channels to the second device 220 in step 1430. As an added layer of security, the second device 220 verifies the code by sending it to the authentication server 250 in step 1440. If the code is valid, the authentication server 250 validates the user on the second device 220 in step 1450 so that the user is able to login for access to a protected website.

Figure 15:
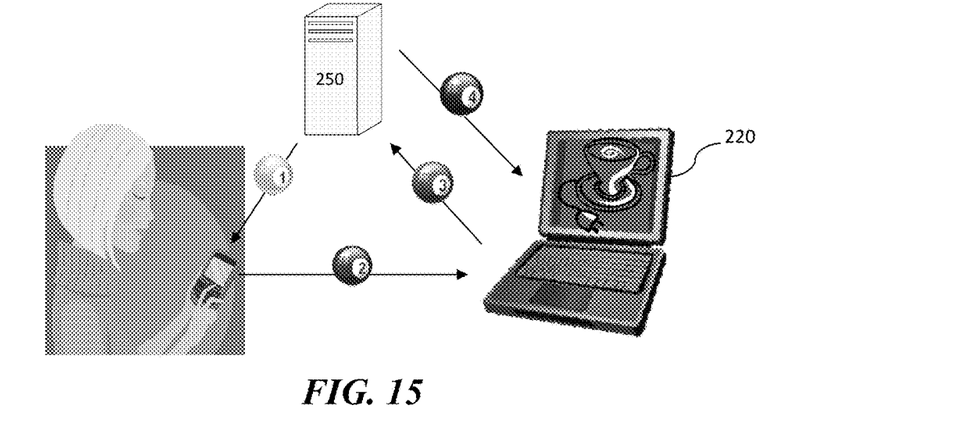
FIG. 15 is an illustrative example of a use-case scenario involving an Internet café, according to an embodiment of the present disclosure.

To illustrate this embodiment using the example of a user attempting to access a password-protected website 225 while in an Internet café, we refer to the illustration of FIG. 15. Here we see a user with a mobile device 110. While at the café, assume the user wishes to use a laptop device 220 available at the café in order to check her mail and perhaps do some on-line shopping. To this end, she needs to first access her email account on-line 225. After initiating a login procedure on the laptop 220, an authentication code is required to verify her identity on her on-line email account.

Because she is in a public setting with potential eavesdroppers, perhaps even sharing a table with other patrons, this user is uncomfortable typing in a password to access her email, similar to the unease people feel when entering their PIN at an ATM when other people are close by. With this embodiment, however, she does not have to type in a password or other code. Her identity is verified and her access is granted in a seamless, private code exchange, as follows:

First, an authentication server 250 (or her email provider) sends the code to her mobile device 110. The authentication server 250 and the email provider can be the same entity. As an example, a Web server serves a login page and simultaneously sends an MMS containing a code to the user's device 110. When opened, the MMS message plays a sonified code. In this case, neither the device 220 prompting a login screen nor the mobile device 110 initiates the transfer. Instead, the backend server 250 initiates the transfer of the code, thus freeing the user from having to input a password.

After receiving the code, the user's mobile device 110 sends the code to the Internet café laptop 220. In one embodiment, the user action of opening a received MMS from the server 250 triggers a playback of the sonified code. The Internet café laptop 220 receives the code and sends that code back to the authentication server 250 for verification. If the code is the same code the server 250 just sent to the mobile device 110, then the server 250 authenticates the user on the laptop 220. The user is then able to access her on-line account.

In the above-described scenario, the user's participation is limited to opening an MMS from the server 250 to trigger a playback of the sonified code 330. If using the audio channel to effect the code transfer, the code transfer may have involved an audible code confirmation or the transmission may have been accomplished with absolutely no audible sound. If using the visual channel to effect the code transfer, the user may need to hold her device 110 in range of the laptop 220 camera 228.

Challenge-response Embodiment.

The embodiments shown in FIGS. 3 and 5 above can be used to implement a challenge-response approach, as follows. Referring now to the flowchart of FIG. 12, the webpage 225 to which the user is attempting to log into prompts the user with a code (which is encoded in an audio signal or an image). In step 1210 the personal device 110 decodes this code and encrypts it with a key in step 1220. The encrypted code is stored in a pre-installed, personal application on the personal device 110 in step 1230, and then is transmitted back to the webpage 225 in step 1240.

In the case of audio, the response signal is just played out. In the case of an image, the user holds up the personal device 110 such that both screens face each other. Each device's camera can then capture the screen of the other and display images in response. This embodiment is particularly advantageous for access in foreign countries, Internet cafes, airports, and the like, because it requires no data or roaming service; and requires no network connectivity or available WiFi. In this embodiment, the personal device 110 has two mutually exclusive roles: 1) a second connection to the server 250; and 2) an authentication token.

The Challenge-Response embodiment can be combined with the previous embodiments, especially in cases where there is no connectivity. For example, one authentication alternative is the use of an RSA token (or RSA app running on the mobile device 110). The displayed code changes every minute and the user either types it into a login form or copies and pastes it into the login field. Alternately, the device 110 can play the RSA token as a sound. The sound-emitting device can communicate with any other device enabled with a speaker.

All solutions that depend on external factors that cannot be controlled by the user, such as those shown in FIGS. 3 and 5, can include a fallback second-factor means of authentication, such as the traditional text input shown in FIG. 1.

Near-Field Communication Embodiment.

Figure 13:
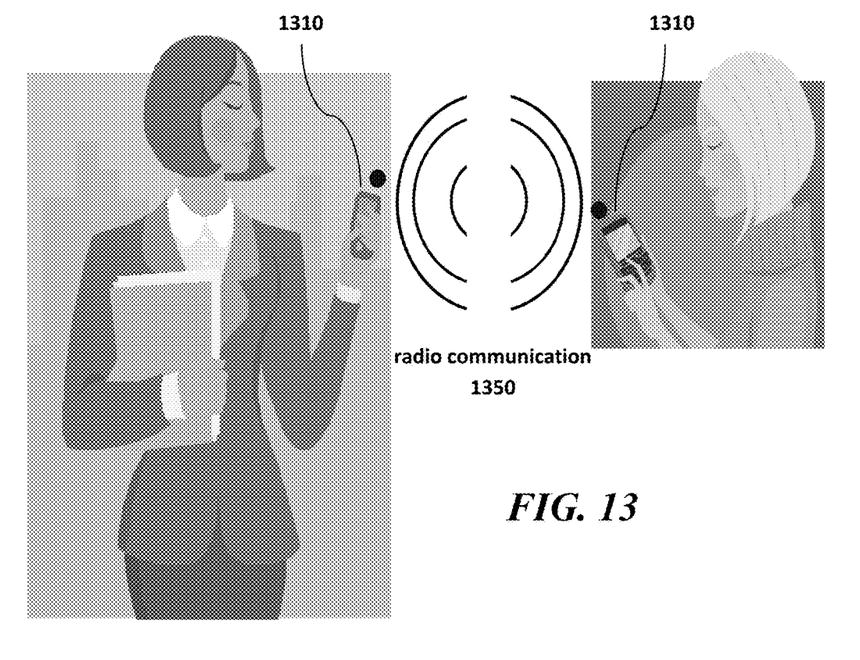
FIG. 13 shows an exemplary image of authentication using near-field communication, according to an embodiment of the present disclosure.

Referring now to FIG. 13, in near-field communication (NFC), smart devices such as smart phones 1310 can establish radio communication 1350 with each other merely by contact and/or proximity, usually no more than a few inches. Once communication is established, it is easy for one device to authenticate the other. The devices themselves can determine proximity using Wifi, Bluetooth or BLE (Bluetooth Low Energy).

Hardware Embodiment.

Figure 10:
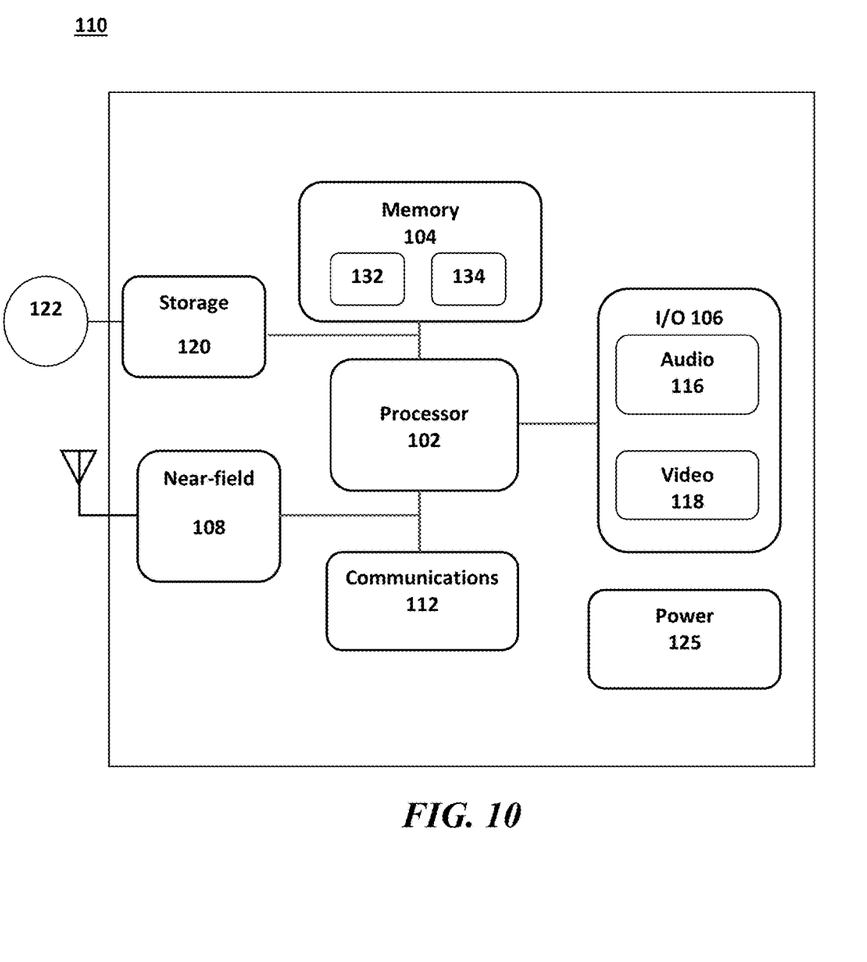
FIG. 10 is a simplified block diagram of an information processing system in which embodiments of the disclosure can be implemented.

Referring now to FIG. 10, the present disclosure can be embodied as a computer system, a method, and/or a computer program product. The computer program product may include a computer readable storage medium (or media) 122 having computer readable program instructions stored thereon for causing a processor 102 to carry out aspects of the present disclosure. FIG. 14 shows an exemplary computing device such as the first device 110. Device 110 includes inter alia, processing device 102 which communicates with an input/output subsystem 106, memory 104, storage 120 and communications interface 112. The processor device 102 may be a general or special purpose microprocessor operating under control of computer program instructions 132 executed from memory 104 on program data 134. The processor 102 may include a number of special purpose sub-processors for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 104 may be partitioned or otherwise mapped to reflect the boundaries of the various memory subcomponents. Memory 104 may include both volatile and persistent memory for the storage of: operational instructions 132 for execution by CPU 102, data registers, application storage and the like. The computer instructions/applications that are stored in memory 104 are executed by processor 102.

The I/O subsystem 106 may include various end user interfaces such as a display, a keyboard, and a touch screen. The I/O subsystem 106 has two subsystems, an Audio subsystem 116, and a video subsystem 118. The Audio subsystem 116 includes a speaker and microphone used for sound signals. The Video subsystem 118 includes a display screen such as a touch screen display, a camera, and a photo sensor, used for visual signals. The I/O subsystem 106 may further include a connection to a network such as a local-area network (LAN) or wide-area network (WAN) such as the Internet.

A near-field communication subsystem 108 can include: a GPS system, a wireless transmitter such as Bluetooth, and a Radio Frequency (RF) sensor for implementing the near-field communication embodiment according to aspects of the present disclosure.

The computer system 110 may also include a removable storage drive 120, representing a floppy disk drive, a magnetic tape drive, an optical disk drive, etc. The removable storage drive 120 reads from and/or writes to a removable storage unit 122 in a manner well known to those having ordinary skill in the art. Removable storage unit 120, represents non-transitory media such as a floppy disk, a compact disc, magnetic tape, optical disk, CD-ROM, DVD-ROM, a flash driver, and any removable storage medium now known or known in the future. As will be appreciated, the removable storage unit 122 includes a non-transitory computer readable medium having stored therein computer software and/or data.

The computer system 110 may also include a communications interface 112. Communications interface 112 allows software and data to be transferred between the computer system and external devices, such as workstation 220. Examples of communications interface 112 may include a modem, a network interface (such as an Ethernet card), a communications port, a PCMCIA slot and card, etc. Software and data transferred via communications interface 112 are in the form of signals which may be, for example, electronic, electromagnetic, optical, sound, or other signals capable of being received by communications interface 112.

In this document, the terms "computer program medium," "computer usable medium," and "computer readable medium" are used to generally refer to both transitory and non-transitory media such as main memory 104, removable storage drive 120, a hard disk, and the like. These computer program products are means for providing software to the computer system 110. The computer readable medium 120 allows the computer system 110 to read data, instructions, messages or message packets, and other computer readable information from the computer readable medium 120.

Therefore, while various embodiments have been described, it will understood by those skilled in the art that other modifications can be made within the spirit of the disclosure. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s)

described above, but rather should be interpreted within the full meaning and scope of the appended claims.

I claim:

1. A method, comprising:
providing, from a server to a second device of a user via a first connection, a request for authentication of the user with a service;
providing, from the server to a first device of the user via a second connection different than the first connection, a non-textual authentication code corresponding to the request for authentication of the user with the service; and
responsive to receiving, at the server and from the second device via the first connection, an indication that a signal corresponding to the non-textual authentication code was received by the second device from the first device via a non-network channel between the second device and the first device but not through the server, authenticating the user with the service, the non-network channel different than the first connection and the second connection.

2. The method of claim 1, the non-network channel comprising an audio channel, the non-textual authentication code indicative of a sound.

3. The method of claim 1, the non-network channel comprising a visual channel, the non-textual authentication code indicative of an image.

4. The method of claim 1, the indication comprising a transformation of the non-textual authentication code.

5. The method of claim 1, the request provided to the second device via a web page sent via the first connection.

6. The method of claim 5, the non-textual authentication code provided to the first device via a multimedia messaging service message sent via the second connection.

7. The method of claim 5, the non-textual authentication code provided to the first device via an app on the first device sent via the second connection.

8. A method, comprising:
providing, from a server to a second device of a user via a first connection, a request for authentication of the user with a service;
providing, from the server to the second device via the first connection, a non-textual authentication code corresponding to the request for authentication of the user with the service; and
responsive to receiving, at the server and from a first device of the user via a second connection different than the first connection, an indication that a signal corresponding to the non-textual authentication code was received by the first device from the second device via a channel between the first device and the second device but not through the server, authenticating the user with the service, the channel different than the first connection and the second connection.

9. The method of claim 8, the channel comprising an audio channel, the non-textual authentication code indicative of a sound.

10. The method of claim 8, the channel comprising a visual channel, the non-textual authentication code indicative of an image.

11. The method of claim 8, the indication comprising a transformation of the non-textual authentication code.

12. The method of claim 8, the request provided to the second device via a web page sent via the first connection.

13. The method of claim 8, the non-textual authentication code provided to the second device via a web page sent via the first connection.

14. The method of claim 8, the indication received from the first device via an app on the first device.

15. An information processing system for authentication across devices, comprising:
a processor device; and
memory comprising computer-executable instructions that when executed by the processor device perform acts comprising:
receiving, at a second device of a user and from a server via a first connection, a request for authentication of the user to access first information;
at least one of:
receiving, at the second device and from a first device of the user via a channel between the second device and the first device but not through the server, a signal corresponding to a non-textual authentication code corresponding to the request for authentication of the user, and providing, from the second device to the server via the first connection, an indication that the signal was received; or
receiving, at the second device and from the server via the first connection, the signal corresponding to the non-textual authentication code and providing the signal from the second device to the first device via the channel but not through the server; and
accessing the first information, via the first connection, based upon the receiving the signal or the providing the signal, the channel different than the first connection.

16. The information processing system of claim 15, the channel comprising an audio channel, the non-textual authentication code indicative of a sound.

17. The information processing system of claim 15, the channel comprising a visual channel, the non-textual authentication code indicative of an image.

18. The information processing system of claim 15, the acts comprising providing a request to access the first information to the server via the first connection.

19. The information processing system of claim 15, the acts comprising receiving, at the second device and from the first device of the user via the channel between the second device and the first device but not through the server, the signal corresponding to the non-textual authentication code corresponding to the request for authentication of the user.

20. The information processing system of claim 15, the acts comprising receiving, at the second device and from the server via the first connection, the signal corresponding to the non-textual authentication code and providing the signal from the second device to the first device via the channel but not through the server.

* * * * *